United States Patent
Cocito et al.

(10) Patent No.: US 12,330,358 B2
(45) Date of Patent: Jun. 17, 2025

(54) SIDE GATE NOZZLE AND INJECTION MOLD

(71) Applicant: THERMOPLAY S.P.A., Pont-Saint-Martin (IT)

(72) Inventors: Carlo Cocito, San Giusto C.se (IT); Guido Bosonetto, Pont-Saint-Martin (IT); Flavio Depré, Arnad (IT); Flaminia Mairate, Donnas (IT)

(73) Assignee: THERMOPLAY S.P.A., Pont-Saint-Martin (IT)

( * ) Notice: Subject to any disclaimer, the term of this patent is extended or adjusted under 35 U.S.C. 154(b) by 0 days.

(21) Appl. No.: 17/769,219

(22) PCT Filed: Oct. 16, 2020

(86) PCT No.: PCT/EP2020/079266
§ 371 (c)(1),
(2) Date: Apr. 14, 2022

(87) PCT Pub. No.: WO2021/074416
PCT Pub. Date: Apr. 22, 2021

(65) Prior Publication Data
US 2024/0116226 A1 Apr. 11, 2024

(30) Foreign Application Priority Data
Oct. 16, 2019 (DE) ............... 10 2019 127 956.9

(51) Int. Cl.
*B29C 45/28* (2006.01)
*B29C 45/17* (2006.01)
*B29C 45/27* (2006.01)

(52) U.S. Cl.
CPC ...... *B29C 45/2803* (2013.01); *B29C 45/2735* (2013.01); *B29C 2045/1739* (2013.01);
(Continued)

(58) Field of Classification Search
CPC ........ B29C 45/2735; B29C 2045/2775; B29C 2045/2759; B29C 2045/2783
See application file for complete search history.

(56) References Cited

U.S. PATENT DOCUMENTS 7,794,228 B2    9/2010  Catoen
8,282,387 B2   10/2012  Braun
(Continued)

FOREIGN PATENT DOCUMENTS

CA   2 785 980 A1   8/2011
DE   196 49 621 A1  6/1998
(Continued)

OTHER PUBLICATIONS

Reli extended tip set screw (Year: 2024).*
(Continued)

*Primary Examiner* — Virak Nguon
(74) *Attorney, Agent, or Firm* — CANTOR COLBURN LLP

(57) ABSTRACT

A side gate nozzle (1) includes a supply block (2), a distribution block (3) and a nozzle block (4) interconnected to each other in an axial direction (z). The nozzle block (4) comprises at least one nozzle recess (5), in which a nozzle insert (6) is arranged. The nozzle insert (6) is in the axial direction (z) held by an individual set screw (7) directly or indirectly interconnected to the nozzle block (4).

20 Claims, 10 Drawing Sheets

(52) U.S. Cl.
CPC .............. *B29C 2045/2759* (2013.01); *B29C 2045/2783* (2013.01); *B29C 2045/2798* (2013.01)

(56) References Cited

U.S. PATENT DOCUMENTS

| | | | |
|---|---|---|---|
| 8,899,963 B2 | 12/2014 | Braun | |
| 2011/0033570 A1 | 2/2011 | Braun | |
| 2012/0118999 A1 | 5/2012 | Braun | |
| 2012/0263823 A1* | 10/2012 | Catoen | B29C 45/2735 425/569 |

FOREIGN PATENT DOCUMENTS

| | | | |
|---|---|---|---|
| DE | 20 2008 005 073 U1 | 7/2008 | |
| DE | 20 2009 004786 U1 | 9/2010 | |
| DE | 10 2009 048 368 A1 | 4/2011 | |
| DE | 102010049394 A1 | 4/2012 | |
| EP | 2308664 A1 * | 4/2011 | ......... B29C 45/2735 |
| EP | 2 639 035 A1 | 9/2013 | |
| KR | 10-1326250 B1 | 11/2013 | |
| KR | 1326250 B1 * | 11/2013 | |
| KR | 10-2013-0139505 A | 12/2013 | |
| KR | 2013139505 A * | 12/2013 | |
| SE | 500 650 C2 | 8/1994 | |
| WO | 2015197799 A1 | 12/2015 | |

OTHER PUBLICATIONS

Weaver square head socket set screw (Year: 2024).*
EPO (Riswijk, NL), English language version of the International Search Report, Form PCT/ISA/210, for International Application PCT/EP2020/079266, Jan. 22, 2021 (3 pages).
German Office Action for German Application No. 10 2019 127 956.9; Report Mail Date Feb. 5, 2024 (11 Pages—with machine translation).
Chinese Office Action for Chinese Application No. 202080072952.8; Report Mail Date Mar. 27, 2024 (28 Pages—with English Translation).

* cited by examiner

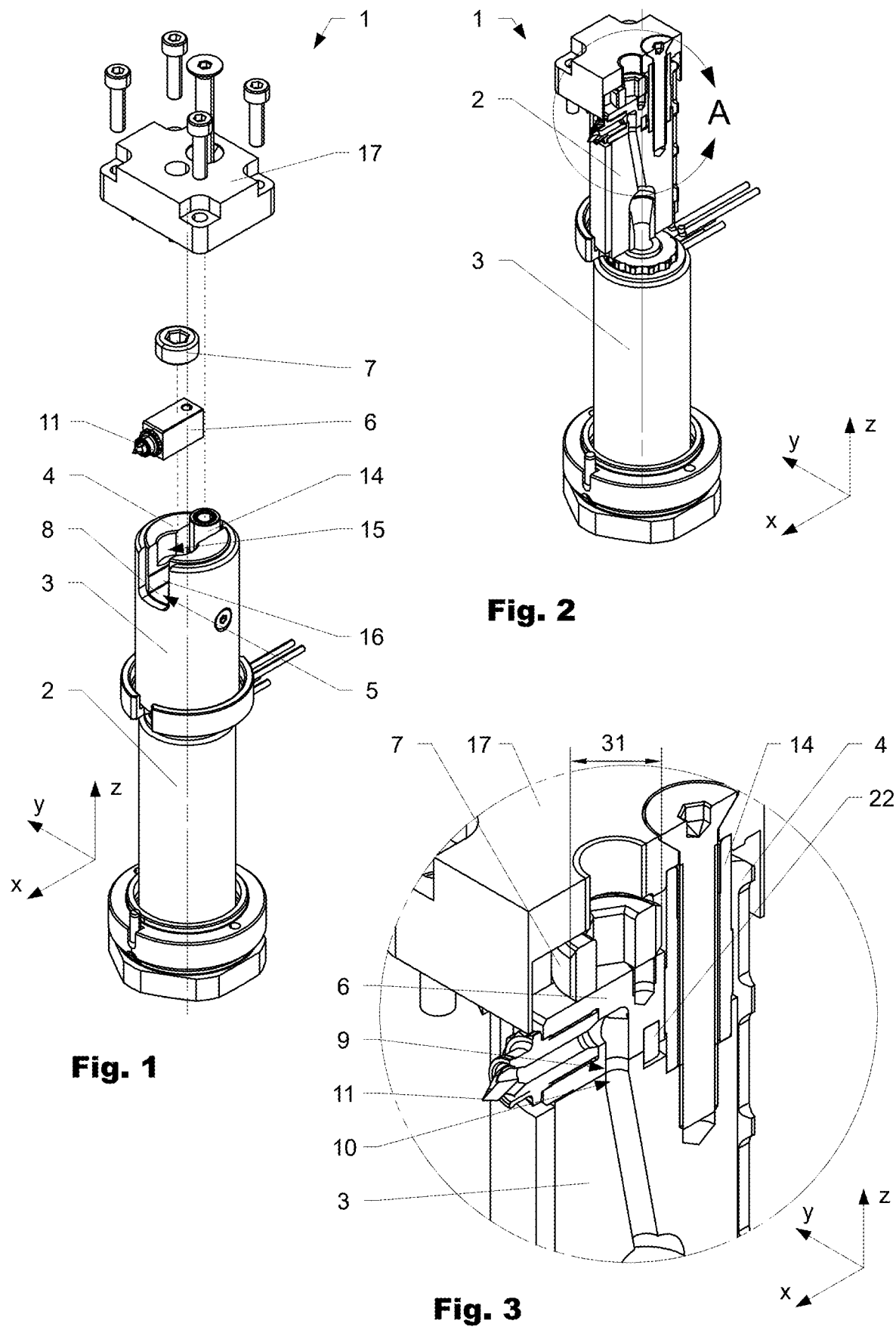

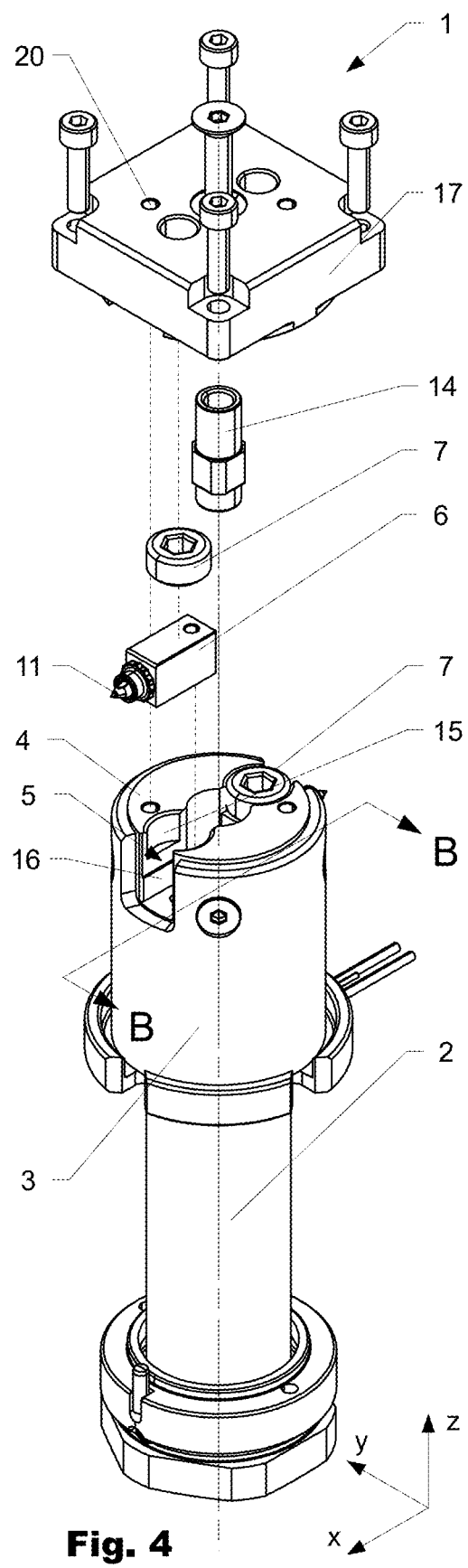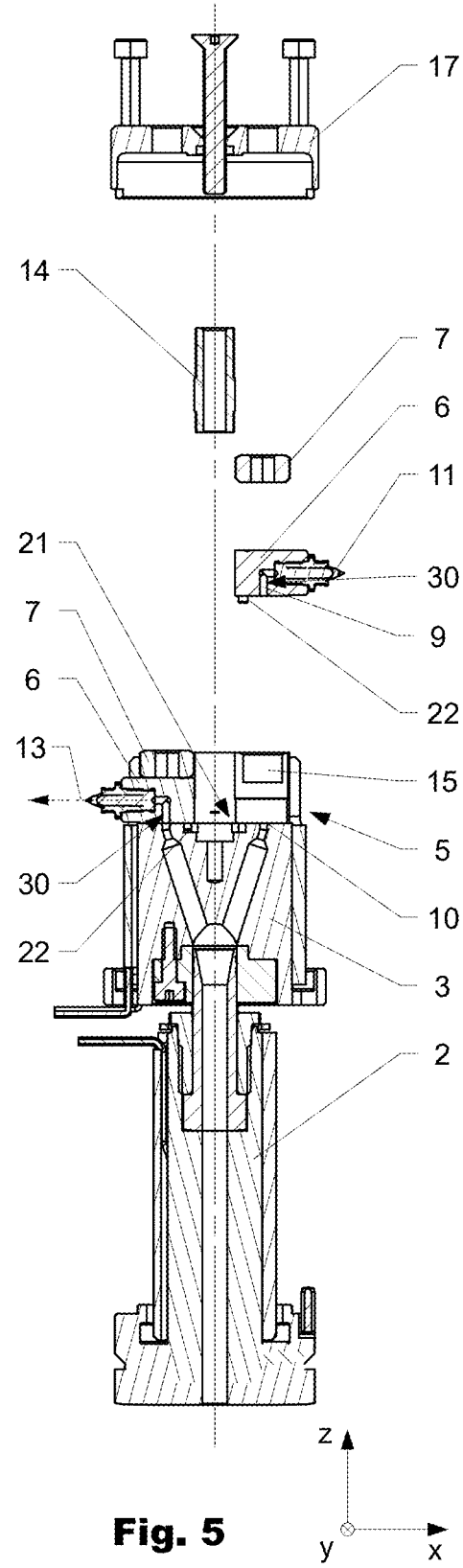
Fig. 4
Fig. 5

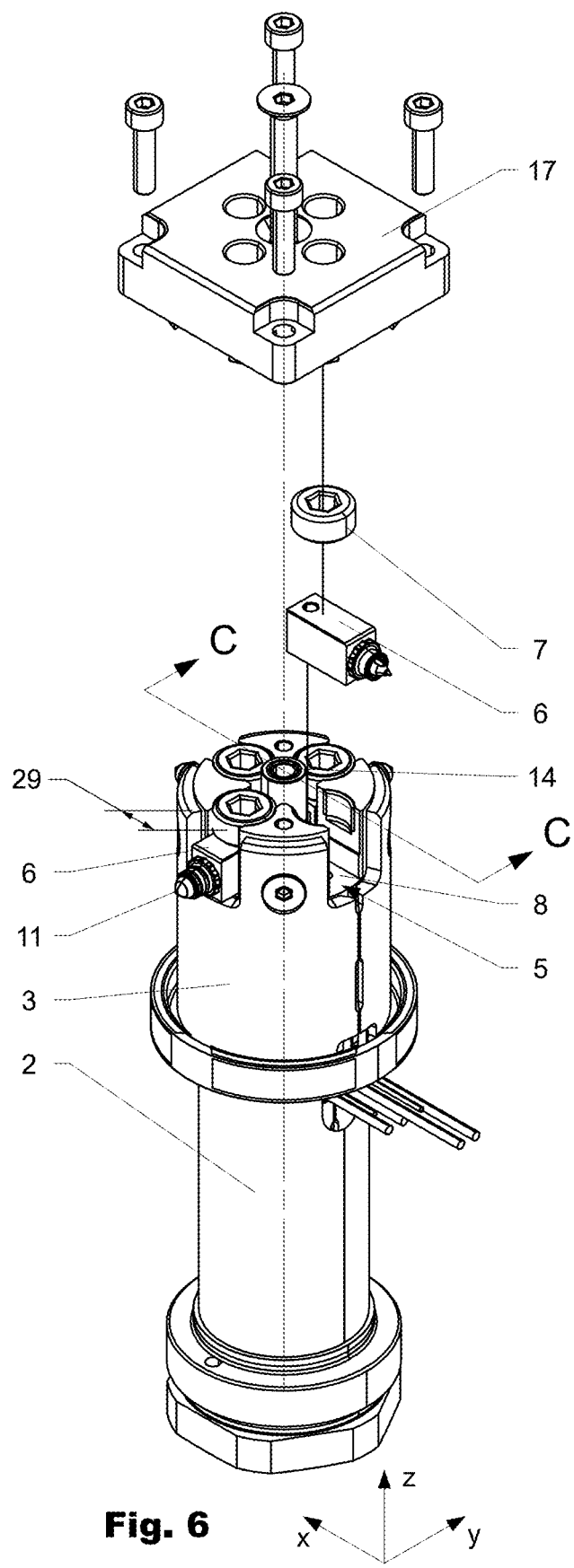
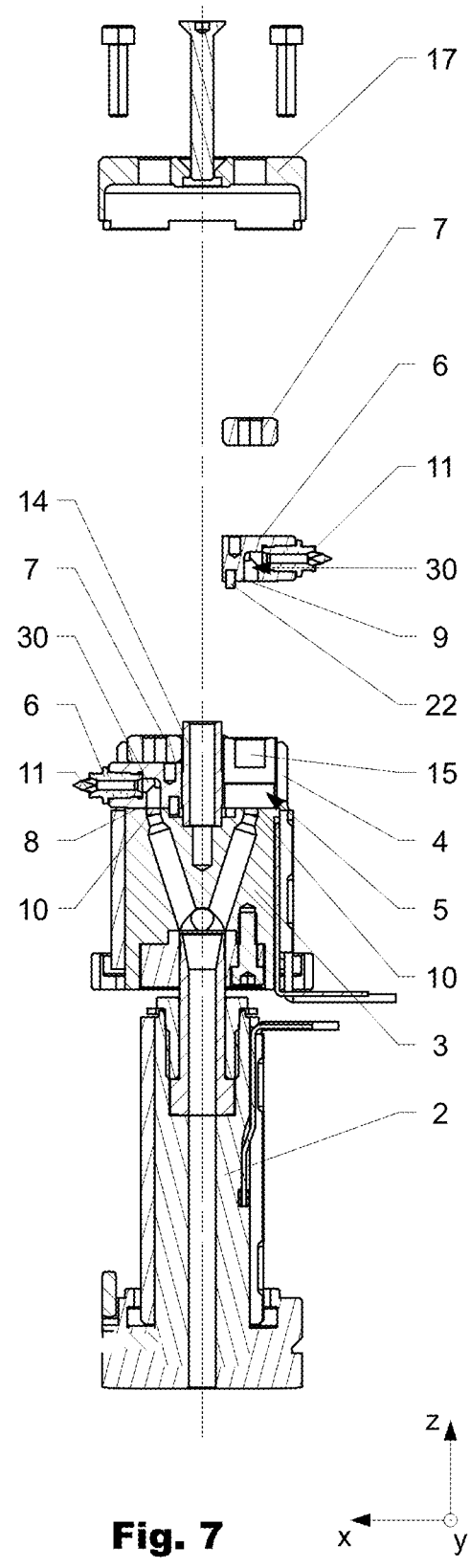
Fig. 6
Fig. 7

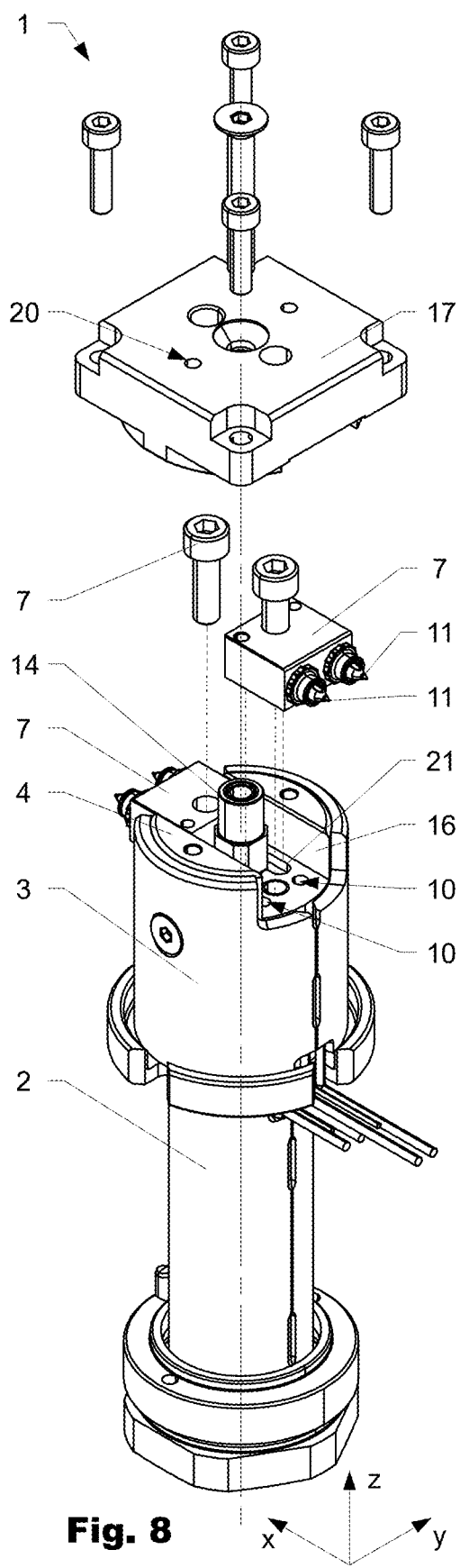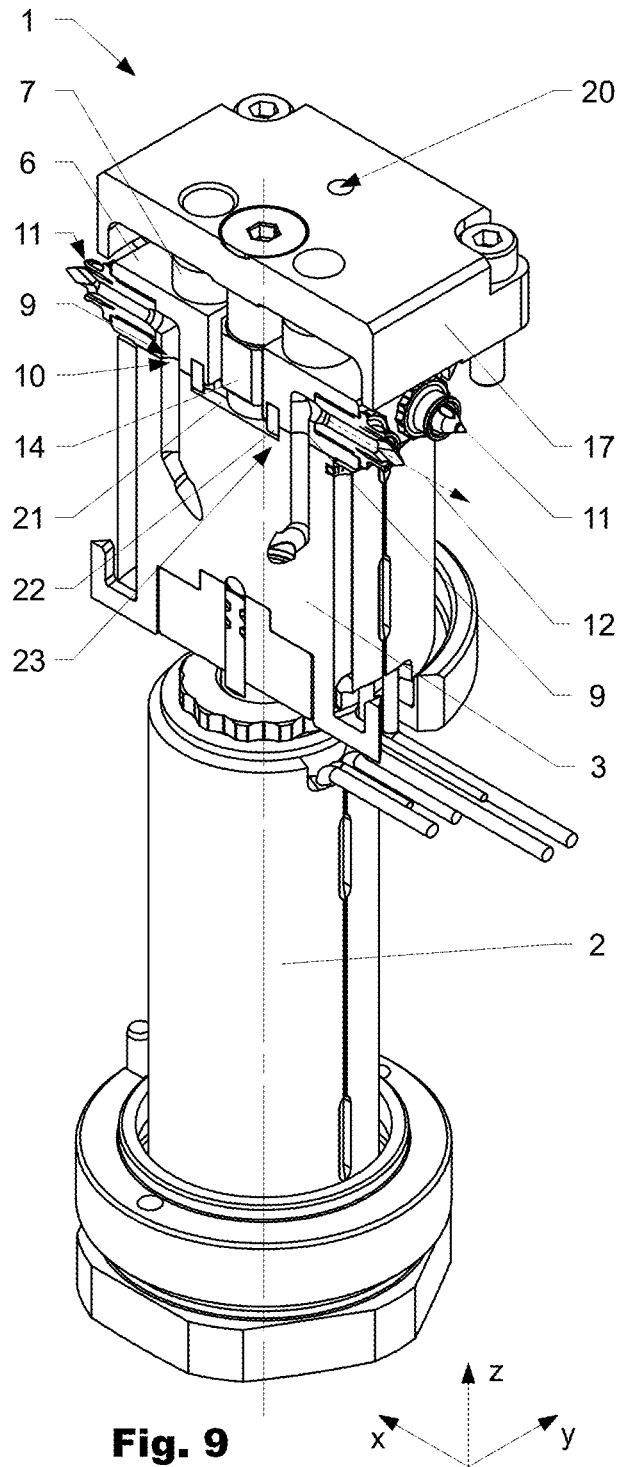
Fig. 8
Fig. 9

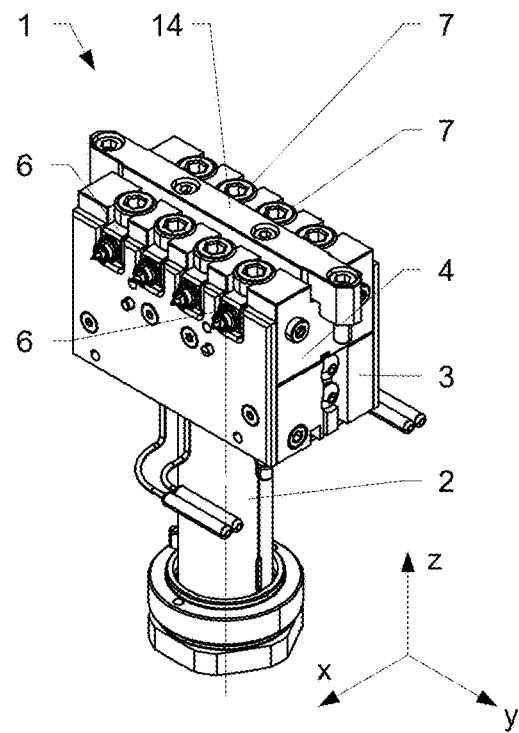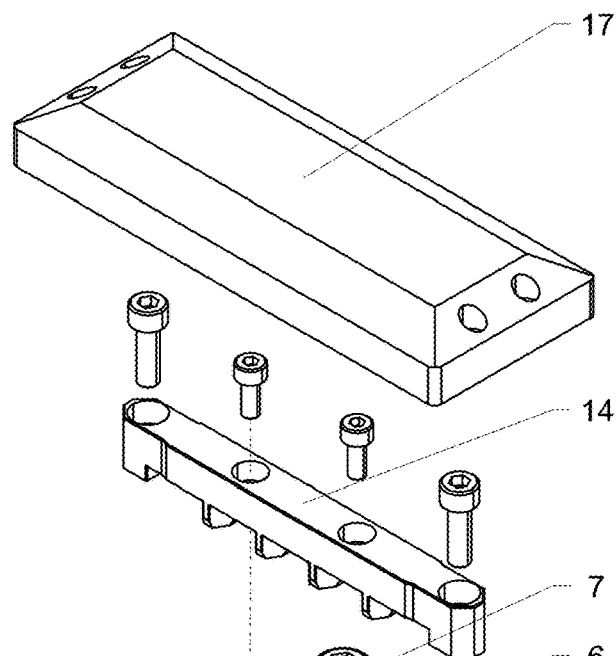
Fig. 10
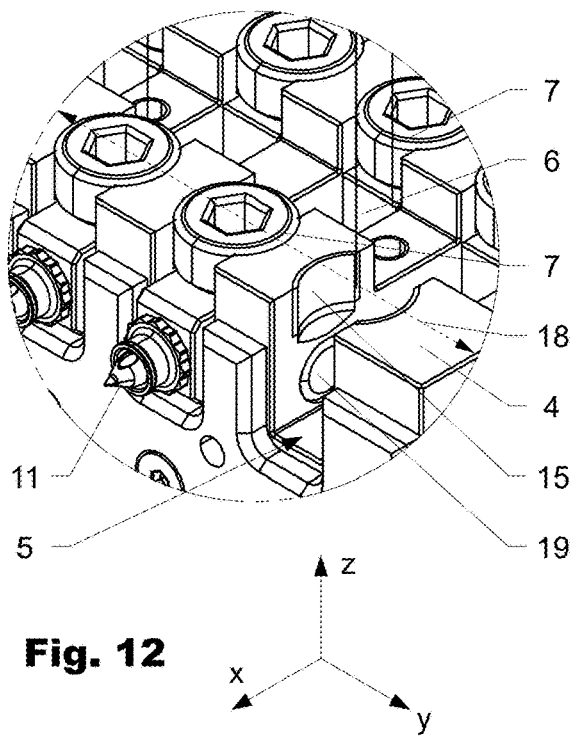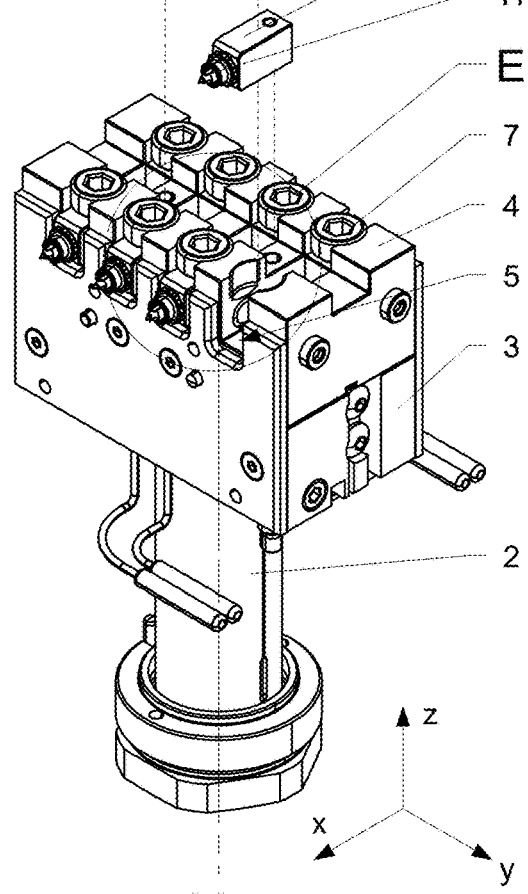
Fig. 12
Fig. 11

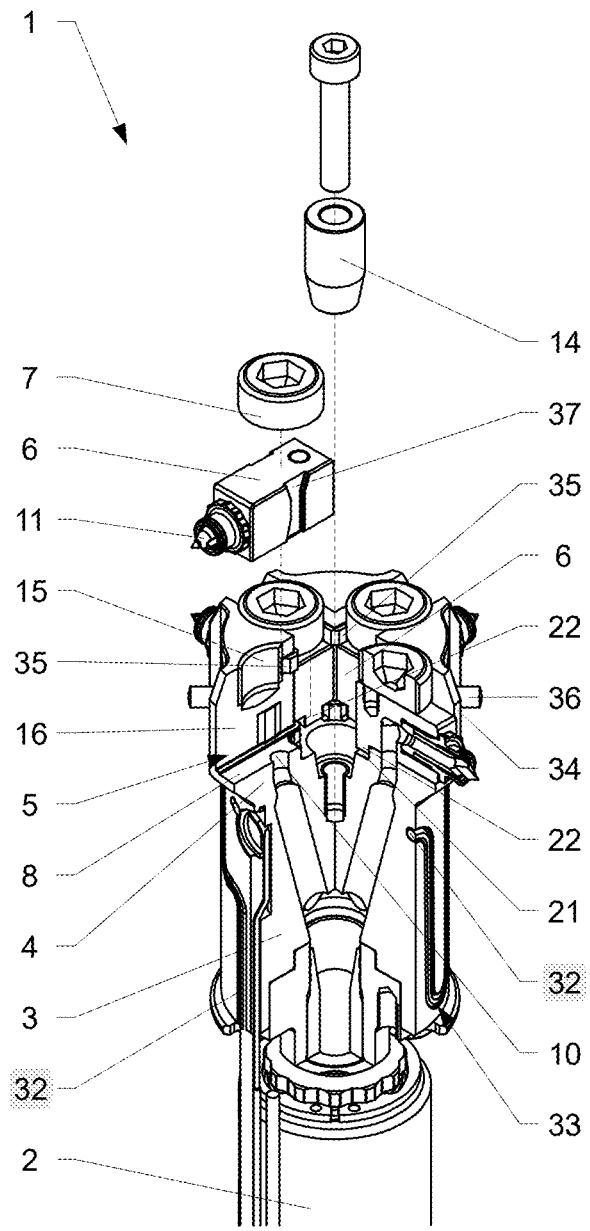
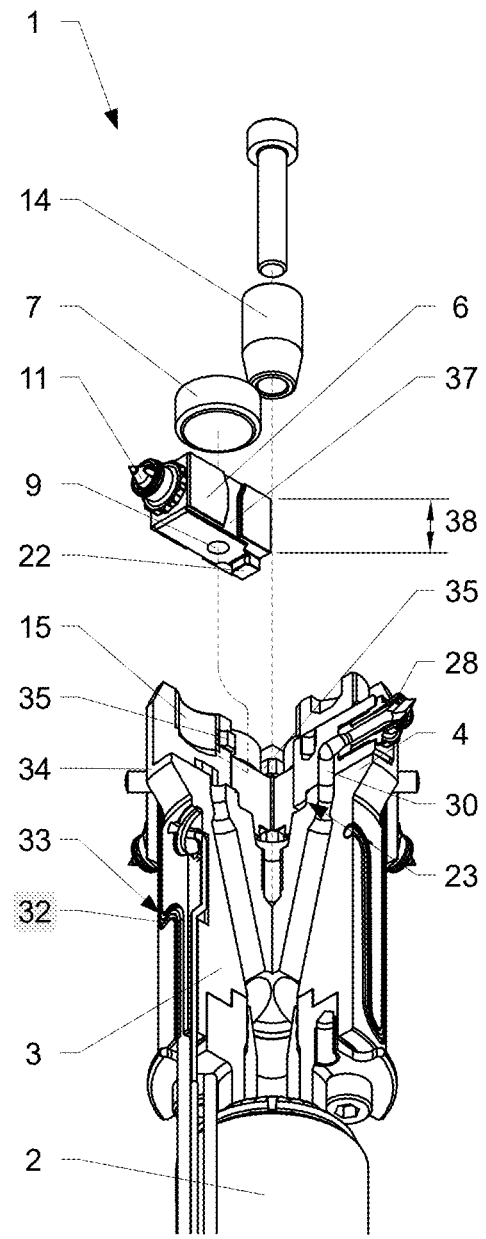
Fig. 19
Fig. 20

SIDE GATE NOZZLE AND INJECTION MOLD

CROSS REFERENCE TO RELATED APPLICATION

This application is a National Phase filing in the United States, under 35 USC § 371, of PCT International Patent Application PCT/EP2020/079266, filed on 16 Oct. 2020 which claims the priority of German Patent Application DE 10 2019 127 956.9, filed 16 Oct. 2019.

These applications are hereby incorporated by reference herein in their entirety and is made a part hereof, including but not limited to those portions which specifically appear hereinafter.

BACKGROUND OF THE INVENTION

Field of the Invention

The present disclosure is directed to a side gate nozzle and a thereto related injection mold for injection molding plastics and other thermoplastic materials.

Discussion of Related Art

From the prior art, side gate nozzles comprising several nozzle tips are known. The nozzle tips, which in the side gate nozzle are usually arranged sideways with respect to the general direction of the side gate nozzle, are in fluid communication with a common nozzle block. The nozzle block is, with respect to the melt flow direction, arranged upstream. With respect to the melt flow direction arranged downstream, the nozzle tips are each interconnected to a cavity suitable to receive during production melted plastic material via the nozzle tip. While the nozzle tips and the thereto interconnected nozzle block are kept on a temperature above the melting temperature of the plastic material, tool plates between which at least one cavity is arranged, is kept on a temperature significantly below the melting temperature of the plastic material such that the plastic material injected into the cavity is cured immediately when in contact with a cavity wall to form the plastic part efficiently. The overall construction of the side gate nozzle must be done in a way, that geometric deformation which occurs due to different temperatures and changes during heat up and operation has no negative impact on the overall system and performance. In addition, it is advantageous when the nozzle tips can be easily removed, respectively disengaged from the related cavity, e.g., for maintenance reason, wherein a precise alignment of the nozzle tips need to be ensured. From the prior art, several attempts are known to address the above problem. A selection is briefly described hereinafter.

SE500650C2 was first published in August 1994 in the name of Hans Müller. It relates to an arrangement for side sprue channels, which comprises a number of side outlet openings. The side outlet openings extend laterally from a channel intended for plastified polymer material to flow through. They adjoin mainly radially extending torpedo tips. The torpedo tips are received by a sprue channel base which is releasably connected to the framework of the sprue channels.

DE19649621A1 was first published in June 1998 in the name of EWIKON Heißkanalsysteme GmbH. It relates to an adapter for use with a nozzle manifold of a hot runner injection molding system for fluidly connecting at least two runner sections and thereby distribute and conduct melt to cavities of an injection mold, includes a plug having at least one end face formed with a first opening for fluid connection to one runner section and a cylindrical or conical wall surface formed with a second opening for fluid connection to another runner section and extending at an angle with respect to the one end face, and a force-applying unit so acting upon the plug as to urge the end face and the wall surface into a fluid-tight pressure fit upon mating sur-faces of the nozzle manifold.

DE202008005073U1 was first published in August 2007 in the name of EWIKON Heißkanalsysteme GmbH. It relates to a hot runner nozzle for lateral injection of plastic components. The nozzle includes a multi-part nozzle body including at least one tip element which protrudes outwardly over a circumferential area of the nozzle body. The multi-part nozzle body further includes a nozzle body clamping disk section and a nozzle body base section having an axial side that has at least one recess arranged on the axial side to accommodate the at least one tip element.

DE102009048368A1 was first published in April 2011 in the name of HASCO Hasenclever GmbH. It relates to an injection nozzle for guiding melt mass, in particular in a plastic injection mold, by means of which melt mass can be supplied to several mold cavities during an injection molding cycle, wherein the melt mass can be guided from a master channel formed at least partially in the nozzle body into at least two branch channels, wherein the branch channels are formed at least partially by a nozzle tip which is provided with an outlet opening via which the melt mass can be supplied to the mold cavity, wherein each nozzle tip can be positioned in a bearing seat and can be detachably fastened to the nozzle body by means of at least one retaining element.

CA2785980AA was first published in June 2012 in the name of Husky Injection Molding Systems. It relates to a side gate nozzle assembly having a nozzle body and at least one side gate nozzle tip assembly wherein the nozzle body and the at least one side gate nozzle tip assembly are slidably engaged to each other.

EP2639035A1 was first published in September 2013 in the name of Mold-Masters 2007 Ltd. It relates to an edge-gated injection molding apparatus having an injection manifold assembly for distributing a melt stream of moldable material to a plurality of mold cavities aligned on opposing sides of the injection manifold assembly. The injection manifold assembly includes a plurality of melt outlets with each melt outlet being in fluid communication with a respective mold cavity, and a plurality of biasing components disposed along a centerline of the injection manifold assembly. A nozzle seal is disposed between each injection manifold assembly melt outlet and its corresponding mold cavity. Each biasing component is disposed between a pair of melt outlets and corresponding nozzle seals for biasing the melt outlets and nozzle seals outward from the centerline of the injection manifold assembly toward their respective mold cavities and applying a preload thereto.

SUMMARY OF THE INVENTION

In difference to the prior art, a side gate nozzle according to the disclosure usually comprises a supply block, a distribution block and a nozzle block interconnected to each other in an axial direction. Depending on the field of application, at least the distribution block and the nozzle block may be integrally formed.

The nozzle block usually comprises at least one nozzle recess extending in an outward direction. In the nozzle recess at least one nozzle insert comprising at least one nozzle tip is arranged. The nozzle block may comprise multiple nozzle inserts each arranged in a respective nozzle recess or in a common nozzle recess. If present, the nozzle inserts are preferably arranged on the same level with respect to the general axial direction.

The at least one nozzle insert is in the mounted state preferably held, at least in the axial direction, by a set screw directly interconnected to the nozzle block. Thereby more accurate adjustment becomes possible. Good results are achieved when the set screw expands at least partially across the nozzle recess. In a preferred variation, the diameter of the set screw is larger than the diameter of the nozzle recess in a lateral direction.

The set screw usually interacts with an inside thread, which is preferably arranged at two opposite side walls of the nozzle recess. Thereby unwanted movements, e.g., lifting off etc. can be safely prevented although other adjustments, e.g., in transversal direction and/or in the direction of the nozzle due to thermal expansion, may remain possible if necessary.

If present, a cover plate may be mechanically interconnected to the nozzle block and a mold plate of the injection mold in which the side gate nozzle is arranged, to compensate torque when setting the set screws. The cover plate preferably comprises openings arranged coaxial to the below arranged set screws, thereby allowing access to the set screws in the mounted state. In certain cases, the set screws can be arranged in a cover plate arranged above the nozzle inserts.

For each nozzle tip, the nozzle insert comprises an inlet opening which is pressed by the set screw against an outlet opening arranged at the bottom of the nozzle recess. A good sealing performance between the inlet opening of the nozzle insert and the outlet opening is achieved when the set screw is arranged concentric with respect to the outlet opening as in this way the applied pressure can is evenly distributed.

The at least one nozzle tip attached to a nozzle insert is preferably pointing in the respective outward direction similar to the recess. Depending on the field of application, two or more nozzle tips can be attached to a common nozzle insert.

Depending on the field of application, the nozzle block may have a cylindrical shape or a cuboid shape depending on the arrangement of the nozzle inserts, respectively the nozzle tips and their interconnection to the thereto related cavities.

For assembly and/or maintenance the nozzle inserts may be arranged displaceable in the nozzle recess with respect to the outward direction. Thereby it becomes possible to interconnect the nozzle inserts in a slidable manner with respect to the cavity.

Furthermore, the nozzle block may comprise at least one guiding groove in the outward direction into which a pin-shaped retaining means usually attached to the nozzle insert engages and limits the movement of said nozzle insert in the outward direction. The retaining means can be integrally formed with the nozzle insert or be designed as a separate element attached thereto. The guiding groove may e.g., be at least partially arranged at a wall of the nozzle recess. The nozzle insert during operation is preferably supported in the inward direction, against the direction of the melt flow, by a spacer (first spacer). The spacer can be removably attached to the nozzle block and/or distribution block. The first spacer may at least partially consist of a material with a smaller coefficient of thermal expansion than the material of the nozzle block, however various materials are also possible like steel or titanium alloys. In the opposite direction, the nozzle insert is held in the direction of the melt flow during operation by the pin-shaped retaining means in contact with an end section of the guiding groove. If appropriate the pin-shaped retaining means can have a rectangular cross-section in order to contact a correspondingly formed end section of the guiding groove in a planar manner in order to prevent misalignment of the nozzle tip with respect to the cavity.

In some variations the spacer can be formed as a hollow cylinder or a beam. The spacer can be attached to the nozzle block and/or distribution block by means of at least one screw.

Good results are possible when the spacer supports the nozzle insert in an elastic pretensioned manner, i.e., against the force of a spring, in the outward direction via a contact surface. This can be achieved in that the spacer is designed as a spring e.g., in that it is formed as a hollow cylinder which comprises slits in the axial direction allowing a spring like displacement of the hollow cylinder wall in a radial outward direction and thus an elastic support of the nozzle inserts during operation and/or assembly.

In some variations at least two nozzle inserts are arranged neighboring to each other. If appropriate, their lateral position can be defined by a second spacer which can be arranged laterally movable. Preferably the second spacer at least partially consists of a material with a smaller coefficient of thermal expansion than the material of the nozzle block.

Good results can be achieved when the first and/or the second spacer are made from a material having a low coefficient of thermal expansion, such as Invar® or the like.

The cover plate of the side gate nozzle may comprise at least one alignment through-hole in the axial direction to temporarily interconnect in the mounted state the cover plate to the nozzle block in a torsionally resistant manner. The nozzle block may comprise at least one opening which is preferably in the assembled state coaxially aligned with an associated through-hole of the cover plate. A temporary torsionally resistant connection between the cover plate and the nozzle block can be established by inserting an elongated connection device into the through-hole and extending into the opening. By forming a form fit with the through hole and/or the opening the connection device provides a torsionally resistant connection between the cover plate and the nozzle block. If appropriate, especially when having a rotational symmetrical shape, the side gate nozzle can be interconnected to the injection mold by at least one anti-rotation element preventing damage of the nozzle tips of the side gate nozzle, e.g., when applying torque to the set screws. The anti-rotation element is arranged between the side gate nozzle and the injection mold and supports the side gate nozzle in circumferential direction with respect to the injection mold. Thereby, the torque applied to the set screw is kept away from the nozzle tips when extending into the respective cavities of the injection mold. If present, the at least one anti-rotation element can extend essentially in a radial direction from the outside of the nozzle block and/or the distribution block for an easy and secure insertion of the side gate nozzle into the injection mold. The anti-rotation element is preferably configured to engage during assembly of the mold with corresponding reception indentations and/or protrusions in the mold plate in a form locking manner. The anti-rotation element can be formed, depending on the design e.g., as a pin. In addition to the circumferential support the anti-rotation element may also provide a detachable connection between the side gate nozzle and the injection mold in the radial and/or axial direction.

For optimal performance of the side gate nozzle a heating element can be arranged at least partially in a groove on the outside of the nozzle block and/or the distribution block to control the temperature of the melt. Preferably the heating element comprises at least one meandrous turn between two neighboring nozzle recesses. The heating element can be formed as a band-like, a cable-like, a flat or a tubular heating element arranged in the groove. The groove may at least partially encircle the nozzle block and/or the distribution block in a meandering or sinusoidal manner. In addition, a temperature sensor may be arranged in the nozzle block and/or the distribution block for a precise regulation of the meld temperature.

For aligning the nozzle insert in a lateral direction and in that the nozzle tip with respect to the cavity, in particular during insertion of the nozzle insert, a support means may be arranged in the outward direction adjacent to the nozzle recess. If present, the support means extends at least partially in a radial direction to support the nozzle insert at least in the lateral direction during installation and/or operation. Depending on the design the support means can be formed as at least one projection extending from the nozzle block in a radial direction. Preferably the projection may at least partially be arranged around the nozzle recess and in a flush manner from the two side walls of the nozzle recess. In some variations one projection per nozzle recess extends with an essentially U-shaped cross-section in the radial direction from the bottom and the side walls of the nozzle recess.

For an easy and damage-free insertion of a nozzle insert into a nozzle recess of the side gate nozzle, the side gate nozzle may comprise at least one guiding means protruding from at least one of two opposite side walls of the nozzle recess to prevent an unwanted tilting of the nozzle insert in the axial direction during installation and/or operation. It is preferable that guiding means are arranged, such that the distance between the guiding means and the bottom of the nozzle recess is essentially equal to the height if the nozzle insert in the axial direction such that during installation and/or operation the guiding means at least temporarily interact with a top face of the nozzle insert. The guiding means may be formed as a protrusion from a side wall of the nozzle recess in the lateral direction. In some variations the guiding means can extend between the two opposite side walls of the nozzle recess.

Good results are possible when the nozzle insert comprises a lead in recess extending along a side of the nozzle insert to temporarily accommodate during insertion into the nozzle recess the guiding means formed as a protrusion.

Another aspect of the disclosure is directed to an injection mold which usually comprises at least one cavity module which comprises at least one cavity half connected to a side gate nozzle as described above. Preferably the cavity module comprises at least one nozzle tip recess connected to the cavity half for accommodating a nozzle tip of the side gate nozzle and forming a detachable connection between the nozzle tip and the nozzle tip recess.

A high efficiency in inserting and/or removing of nozzle inserts during maintenance and/or assembly is possible when an injection mold is combined with a side gate nozzle comprising a in an outward direction displaceable arranged nozzle insert. This allows inserting and removing nozzle inserts without the need to separate the side gate nozzle blocks from the cavity module. An assembly of a nozzle insert into the injection mold with attached side gate nozzle may comprise the following steps. When a nozzle insert is inserted into the nozzle recess it is moved in the axial direction until the retaining means engage into the guiding groove. Afterwards the nozzle insert is moved in outward direction while being guided by the retaining means in the guiding groove, until the nozzle tip slides in the nozzle tip recess. In this position the retaining means is in contact with the end region of the guiding groove. In a next step the position of the nozzle insert is secured in the outward direction when the first spacer is inserted in the axial direction and the set screw is applied and tightened.

Preferably the at least one nozzle tip recess comprises a sealing section interacting with the nozzle tip in the mounted state to provide a sealing there between.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

FIG. 1 shows a first variation of a side gate nozzle in an exploded view;

FIG. 2 shows the first variation according to FIG. 1 in a perspective manner and partially sectioned;

FIG. 3 shows detail A according to FIG. 2 in a magnified manner;

FIG. 4 shows a second variation of a side gate nozzle in an exploded view;

FIG. 5 shows a section view across the variation according to FIG. 4 along section line BB;

FIG. 6 shows a third variation of a side gate nozzle in an exploded view;

FIG. 7 shows a section view across the variation according to FIG. 6 along section line CC;

FIG. 8 shows a fourth variation of a side gate nozzle in an exploded view;

FIG. 9 shows the fourth variation according to FIG. 8 in a perspective manner and partially sectioned;

FIG. 10 shows a fifth variation in a perspective view;

FIG. 11 shows the fifth variation in an exploded view;

FIG. 12 shows detail E according to FIG. 11;

FIG. 19 shows a seventh variation of a side gate nozzle in a perspective and partially exploded and partially sectional view;

FIG. 20 shows the seventh variation of FIG. 19 from a different viewing angle;

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 13:
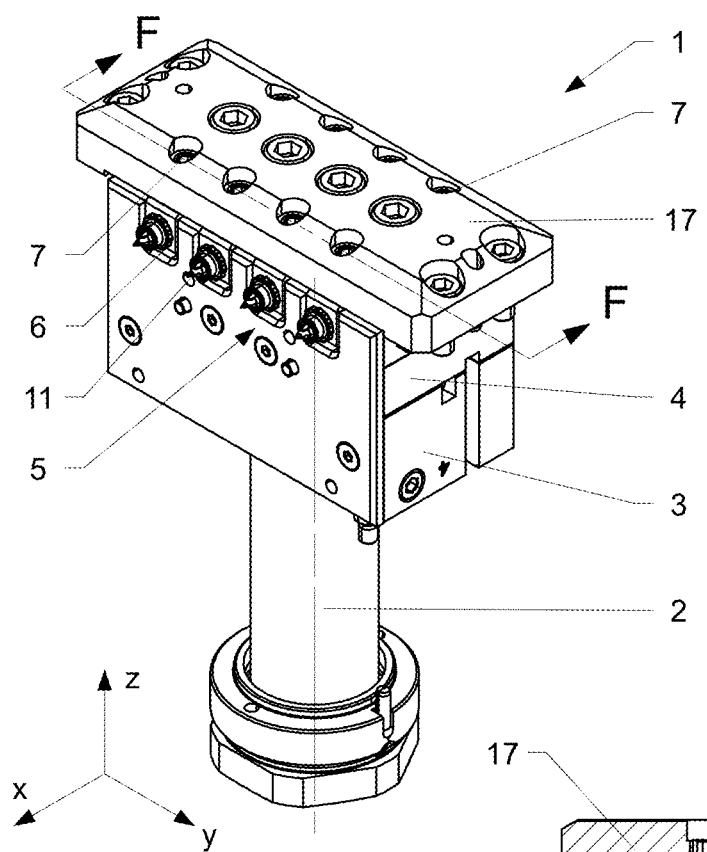
FIG. 13 shows a sixth variation of a side gate nozzle in a perspective view.
Figure 14:
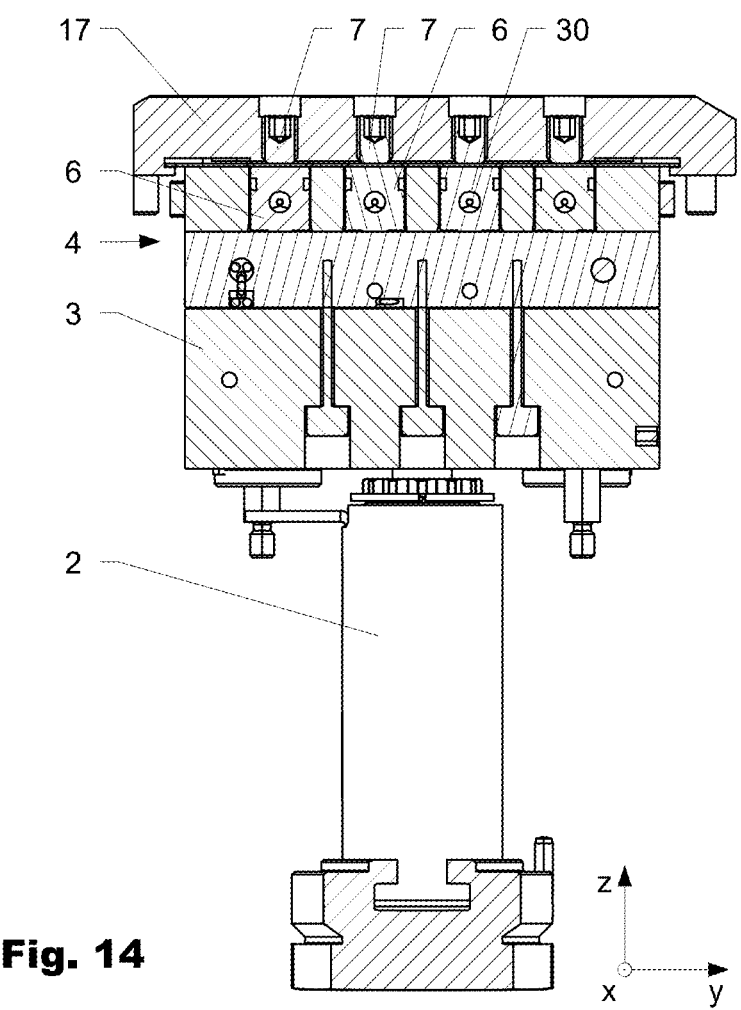
FIG. 14 shows a section view across the variation according to FIG. 13.
Figure 15:
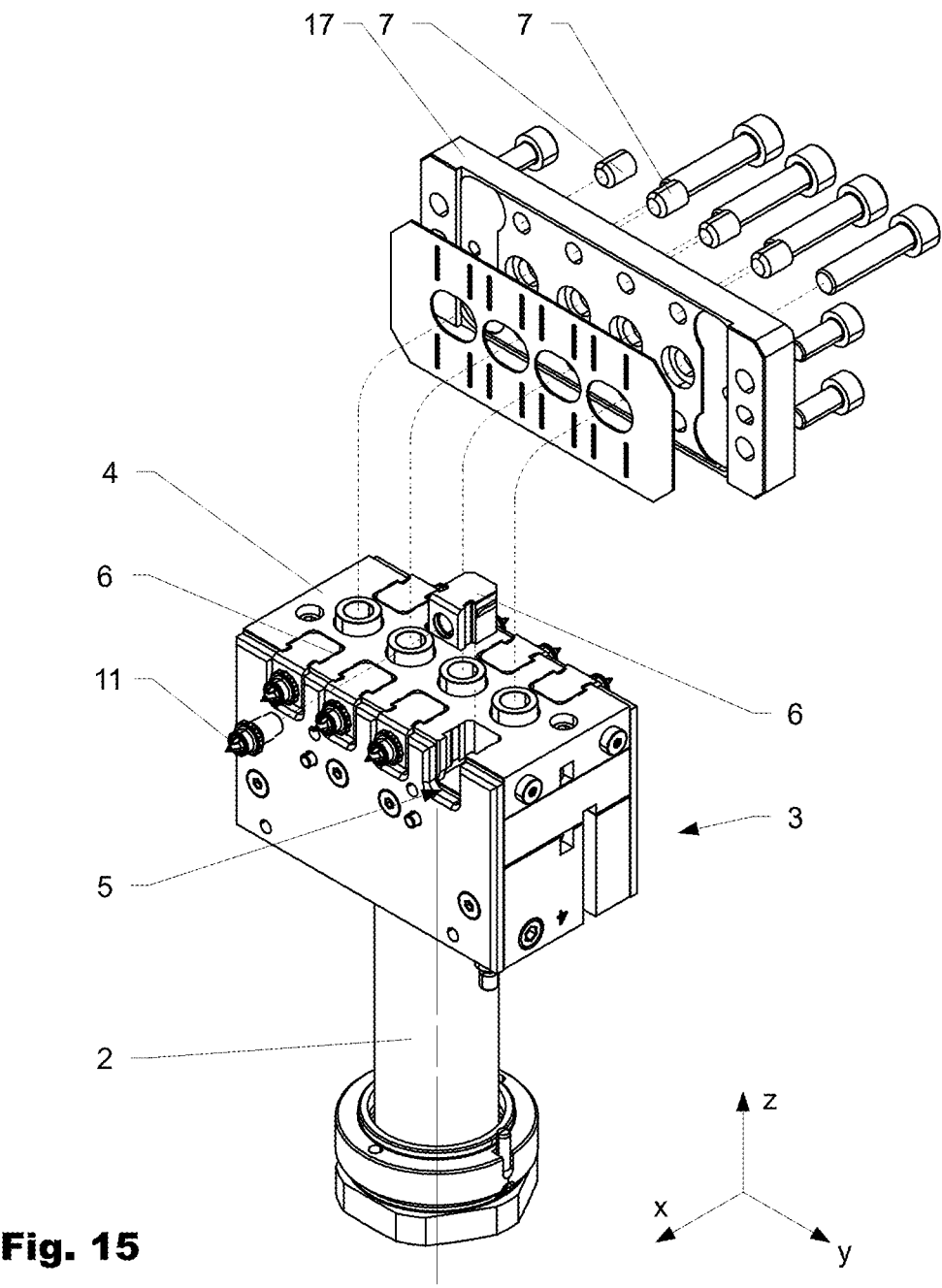
FIG. 15 shows the sixth variation in an exploded view.
Figure 16:
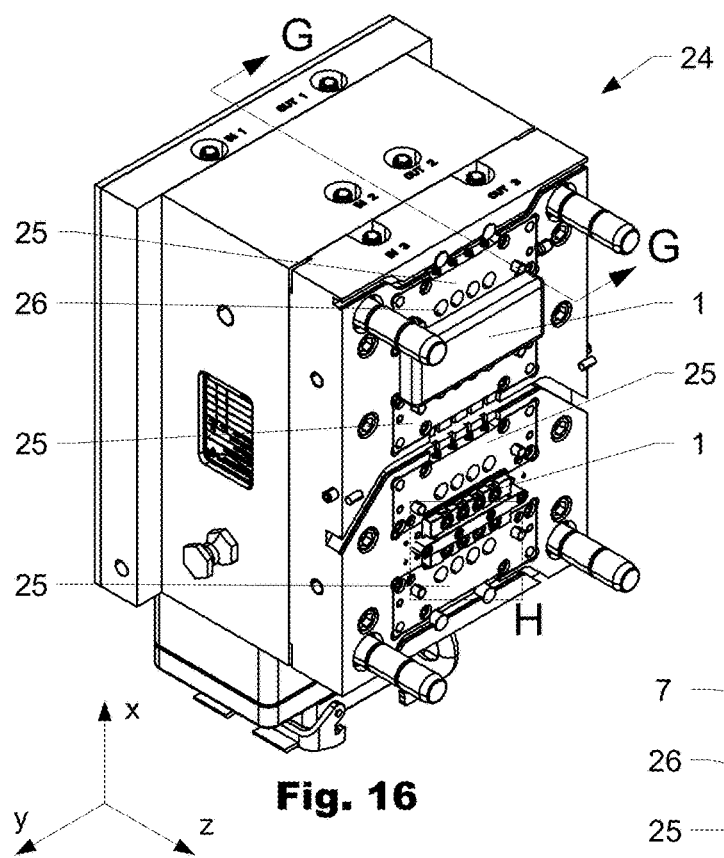
FIG. 16 shows the fifth variation according to FIGS. 10 through 12 arranged in an injection mold.
Figure 17:
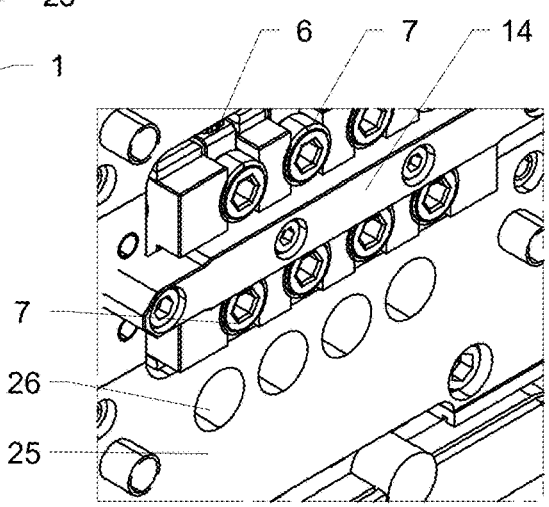
FIG. 17 shows detail H according to FIG. 16.
Figure 18:
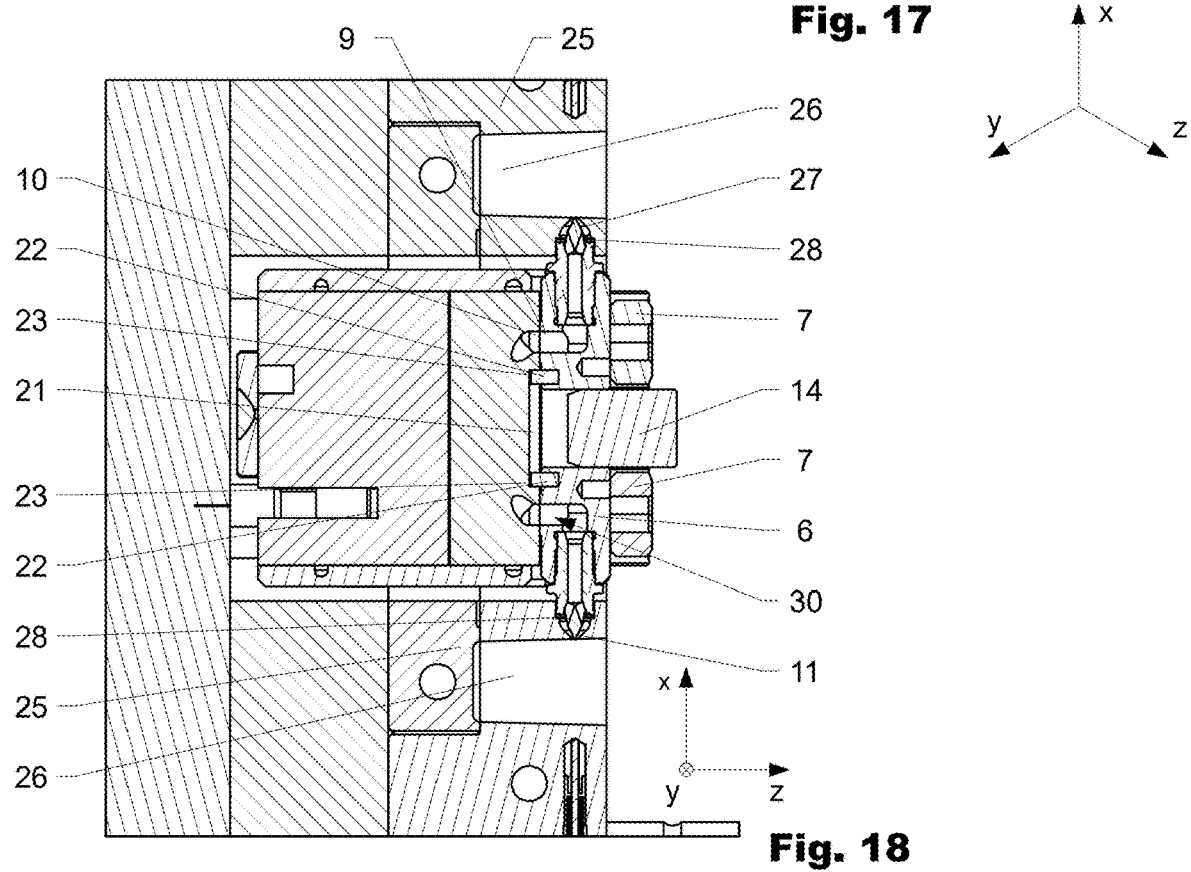
FIG. 18 shows a section view along section line GG according to FIG. 16.
Figure 21:
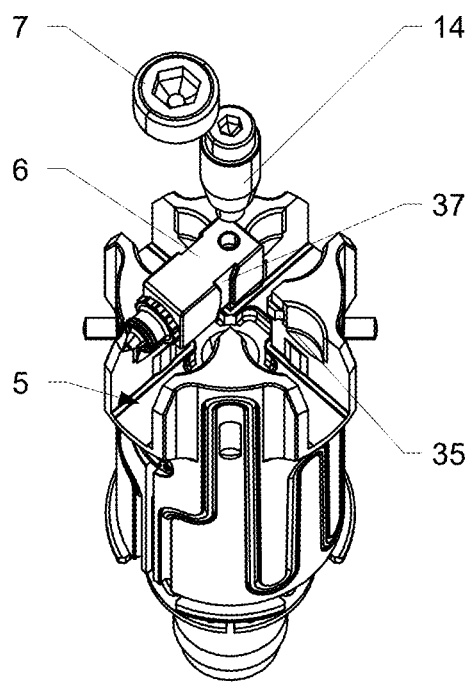
FIG. 21 shows the seventh variation of a side gate nozzle during assembly.
Figure 22:
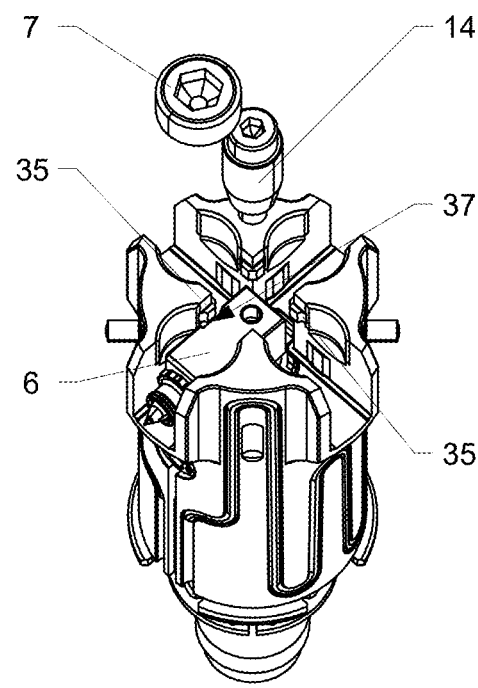
FIG. 22 shows the seventh variation of a side gate nozzle during assembly.
Figure 24:
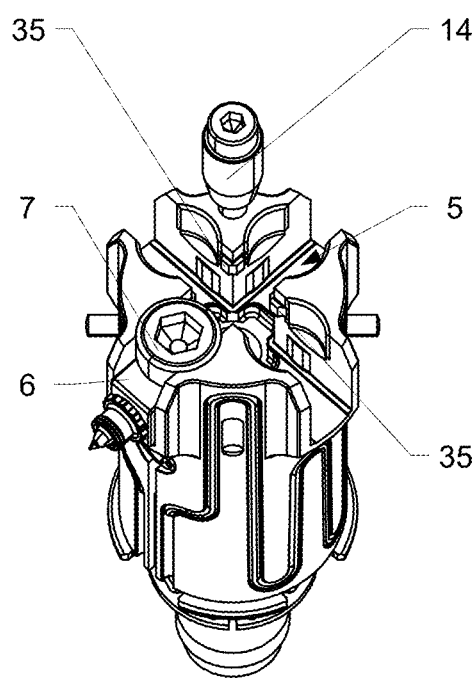
FIG. 24 shows the seventh variation of a side gate nozzle during assembly.

FIG. 1 is showing a first variation of a side gate nozzle 1 in an exploded view. FIG. 2 shows the first variation of the side gate nozzle 1 according to FIG. 1 in a perspective manner and partially sectioned. FIG. 3 shows detail A according to FIG. 2 in a magnified manner. FIG. 4 shows a second variation of the side gate nozzle 1 in an exploded view. FIG. 5 shows a section view along section line BB according to FIG. 4. FIG. 6 shows a third variation of the side gate nozzle 1 in an exploded view. FIG. 7 shows a section view along section line CC of FIG. 6. FIG. 8 shows a fourth variation of the side gate nozzle 1 in an exploded view. FIG. 9 shows the fourth variation according to FIG. 8 in a perspective manner and partially sectioned. FIG. 10 shows a fifth variation of the side gate nozzle 1 in a perspective view. FIG. 11 shows the fifth variation in an exploded view. FIG. 12 shows Detail E according to FIG. 11. FIG. 13 shows a sixth variation of the side gate nozzle 1 in a perspective view. FIG. 14 shows a section view across the variation according to FIG. 13. FIG. 15 shows the sixth variation according to FIG. 13 in an exploded view. FIG. 16 shows the fifth variation according to FIG. 10 through FIG. 12 arranged in an injection mold 24. FIG. 17 shows Detail H according to FIG. 16 and FIG. 18 shows a section view along section line GG according to FIG. 16. FIG. 19 shows a seventh variation of a side gate nozzle 1 in a perspective and partially exploded and partially sectional view and FIG. 20 shows the seventh variation of FIG. 19 from a different viewing angle. FIGS. 21 to 24 show some intermediate steps of inserting a nozzle insert 6.

As e.g., visible in FIG. 1 through FIG. 20 a side gate nozzle 1 according to the disclosure usually comprises a supply block 2, a distribution block 3 and a nozzle block 4 interconnected to each other in an axial direction (here z-direction). The nozzle block 4 comprises at least one nozzle recess 5, in which a nozzle insert 6 is arranged as described hereinafter in more detail. The nozzle insert 6 is in the assembled state held in the axial direction preferably held by a set screw 7 directly or indirectly interconnected to the nozzle block 4.

In the variations according to FIG. 1 through FIG. 7 and FIG. 10 through FIG. 12, the set screw 7 expands completely across the nozzle recess 5. As e.g., visible in FIG. 6, a diameter of the set screw 7 is larger than a width 29 of the nozzle recess 5 in a lateral direction 18. In these variations the set screw 7 interacts with an inside thread 15 arranged in an upper area of the corresponding nozzle recess 5. The inside thread 15 extends in two opposite side walls 16 of the nozzle recess 5 as best visible in FIGS. 3 and 12. It is arranged in an upper area of the nozzle recess 5 above the nozzle insert 6. Thereby the nozzle insert 6 in the mounted position can be pressed in a controlled and individual manner against a bottom 8 of the nozzle recess 5.

In the functionally different variation according to FIG. 13 through FIG. 15, the set screw 7 is not interacting directly with the nozzle block 4. Instead, it is arranged in a separate cover plate 17. The cover plate 17 allows direct access to the set screws 7 from the outside. However, when the cover plate 17 is removed, e.g., for maintenance of one of the nozzle inserts 6, all remaining nozzle inserts 6 become loose too.

For the melt to be transported without leakage the nozzle insert 6 comprises an inlet opening 9 which is usually pressed directly by the respective set screw 7 against an outlet opening 10 arranged at the bottom of the nozzle recess 5. As best visible in FIGS. 3, 5, 7 and 18 a good sealing between the inlet opening 9 of the nozzle insert 6 and the outlet opening 10 is achieved when the set screw 7 is arranged concentric with respect to the respective outlet opening 10 in the bottom 8. This way the applied sealing pressure can be evenly distributed. At least one nozzle tip 11 pointing in outward direction 12 is attached to the nozzle insert 6 as illustrated in FIGS. 5 and 9. The melt is in all shown variations transported from the inlet opening 9 of the nozzle insert 6 to the thereto attached nozzle tip 11 via an insert melt channel 30 arranged inside the nozzle insert 6 interconnecting the inlet opening 9 and the nozzle tip 11.

As can be seen from the sectional illustration of FIG. 5 for assembly and/or maintenance of a side gate nozzle 1 according to the disclosure the nozzle insert 6 is arranged displaceable with respect to the outward direction 12. In order to achieve that, the nozzle block 4 comprises at least one guiding groove 21 in the outward direction 12 into which a pin-shaped retaining means 22 of the nozzle insert 6 engage. This way a displacement of the nozzle insert 6 in the outward direction 12 during assembly is guided by the at least one guiding groove 21. The guiding groove 21 is at least partially arranged in a wall of the nozzle recess 5. As can be seen from FIG. 8 two or more nozzle inserts 6 can be arranged in one nozzle recess 5, in the case at hand there are two nozzle inserts 6 arranged in a common nozzle recess 5. The nozzle insert 6 is held during operation in the outward direction 12 against the direction of the melt flow 13 by a first spacer 14 illustrated e.g., in FIG. 7. Preferably the first spacer 14 at least partially consists of a material with a smaller coefficient of thermal expansion than the material of the nozzle block 4. In the opposite direction, the nozzle insert 6 is held in the direction of the melt flow 13 during operation by the pin-shaped retaining means 22 in contact with an end section 23 of the guiding groove 21. However, in the seventh variation of the side gate nozzle 1, as shown in FIGS. 19 to 24, the retaining means 22 are integrally formed with the nozzle insert 6 and are block-shaped.

In some variations illustrated in FIGS. 10 to 12 at least two neighboring nozzle inserts 6 are spaced in a lateral direction 18 relative to each other by a laterally movable second spacer 19. The second spacer 19 best visible in FIG. 12 at least partially consists of a material with a smaller coefficient of thermal expansion than the material of the nozzle block 4.

In some variations the cover plate 17 of the side gate nozzle 1 comprises an alignment through-hole 20 in the axial direction z as illustrated in FIG. 4 to temporarily inter-connect in the mounted state the cover plate 17 to the nozzle block 4 in a torsionally resistant manner. In some variations the cover plate 17 is mounted to the mold plate, as visible in FIGS. 16 to 18.

FIGS. 16 to 18, show another aspect of the disclosure being directed to an injection mold 24 which comprises at least one cavity module 25 which comprises at least one cavity half 26 connected to a side gate nozzle 1. The injection mold 24 illustrated in FIG. 16 comprises four cavity modules 25 being arranged on two pairs, wherein between the two cavity modules 25 of each pair a side gate nozzle 1 as illustrated in FIG. 10 is arranged. Each cavity module 25 comprises a cavity half 26 per nozzle insert 6/nozzle tip 11. The cavity module 25 further comprises at least one nozzle tip recess 27 connected to the cavity half 26 for accommodating a nozzle tip 11 of the side gate nozzle 1 and forming a detachable connection between the nozzle tip 11 and the nozzle tip recess 27. This is best visible in the FIG. 18, a partial cross-sectional illustration of the injection mold 24 of FIG. 16, which further illustrates that at least one nozzle tip recess 27 comprises a sealing section 28 interacting with the nozzle tip 11 in the assembled state to provide a sealing therebetween. In FIG. 17 a detailed view of a side gate nozzle 1 of the injection mold 24 of FIG. 16 is displayed showing the side gate nozzle 1 arranged between two cavity modules 25.

A high efficiency in inserting and/or removing of nozzle inserts 6 during maintenance and/or assembly is possible when injection mold 24 is combined with a side gate nozzle 1 comprising an in an outward direction displaceably arranged nozzle insert 6. This allows inserting and removing nozzle inserts 6 without the need to separate the side gate nozzle blocks 4 from the cavity module. FIG. 18 makes it possible to understand that an assembly of a nozzle insert 6 into the injection mold 24 with an inserted side gate nozzle 1 may comprise the following steps. When a nozzle insert 6 is inserted into the nozzle recess 5 it is moved in the axial direction z until the retaining means 22 engage into the guiding groove 21. Afterwards the nozzle insert 6 is moved in outward direction 12, while being guided by the retaining means 22 in the guiding groove 21, until the nozzle tip 11 slides in the nozzle tip recess 27. In this position the retaining means 22 is in contact with the end section 23 of the guiding groove. In a next step the position of the nozzle insert 6 is secured in the outward direction 12, x when the first spacer 14 is inserted in the axial direction z and the set screw 7 is applied and tightened.

The seventh variation of the side gate nozzle 1, as shown in FIGS. 19 to 24 comprises a rotationally symmetrical nozzle bock 4. The side gate nozzle 1 comprises in this variation four symmetrically arranged anti-rotation elements 36 extending in a radial direction from the outside of the nozzle block 4 for an easy and secure insertion of the side gate nozzle 1 into an injection mold 24 (not shown). The anti-rotation elements 36 are pin-shaped elements.

Furthermore, the seventh variation of the side gate nozzle 1 comprises a heating element 32 arranged in a groove 33 on the outside of the nozzle and distribution block 3, 4. As visible in FIGS. 19 and 20 the groove 33 encircles the nozzle and distribution block 3, 4 in a meandering manner. As show in in FIGS. 21 to 24 the heating element 32 comprises a meandrous turn between two respective neighboring nozzle recesses 5 and it comprises longitudinal sections towards the meandrous turn and away from the meandrous turn in the axial direction. The shown variation comprises multiple meandrous turns.

As best visible in FIGS. 21 to 24 the nozzle block 4 comprises a skirt-like projection 34 per nozzle recess 5 extending in a radial direction from the nozzle block recess 5 for preventing damage to the respective nozzle insert 6, especially during assembly of the side gate nozzle 1 in the injection mold 24 (not shown) and/or an individual nozzle insert 6. The projection 34 in the shown variation is arranged around the respective nozzle recess 5 extending with an essentially U-shaped cross-section in the radial direction from the bottom 8 and the side walls 16 of the nozzle recess 5.

Figure 23:
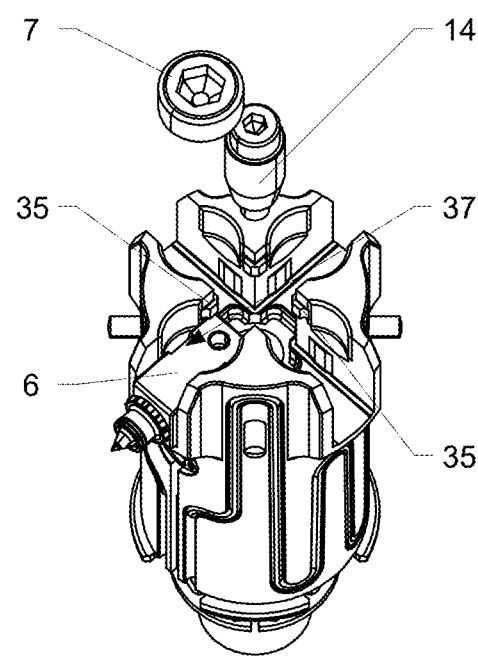
FIG. 23 shows the seventh variation of a side gate nozzle during assembly.

For an easy and damage-free insertion of a nozzle insert 6 into a nozzle recess 5 of the side gate nozzle 1, the side gate nozzle 1 comprises at least one guiding means 35 protruding from both opposite side walls 16 of the nozzle recess 5 to limit the movement of the nozzle insert 5 in the axial direction z during the intermediate step of the installation shown in FIG. 23. This prevents an undesirable tilting of the nozzle insert 6 in the axial direction z. The guiding means 35 are arranged, at a height from the bottom of the nozzle recess 5 in the axial direction equal to the height 38 of the nozzle insert 6, illustrated in FIG. 20. The guiding means 35 are in the shown variation formed as protrusions from both side walls 16 of the nozzle recess 5 in the lateral direction 18. As visible in FIGS. 19 to 24 the nozzle insert 6 comprises two lead in recesses 37 each extending along a side of the nozzle insert 6 to temporarily accommodate during insertion into the nozzle recess 5 the guiding means 35 formed as a protrusion as best visible in FIG. 22.

Rather, the words used in the specification are words of description rather than limitation, and it is understood that various changes may be made without departing from the scope of the invention.

The invention claimed is:

1. A side gate nozzle (1) comprising a supply block (2), a distribution block (3) and a nozzle block (4) interconnected to each other in an axial direction (z), wherein the nozzle block (4) comprises at least one nozzle recess (5), in which a nozzle insert (6) is arranged which in the axial direction (z) is held by a set screw (7) interconnected to the nozzle block (4), wherein the set screw (7) expands at least partially across the nozzle recess (5);

wherein the diameter (31) of the set screw (7) is bigger than the width (29) of the nozzle recess (5) in a lateral direction (18); and wherein the nozzle insert is pressed directly by the set screw (7).

2. The side gate nozzle (1) according to claim 1, wherein the set screw (7) interacts with an inside thread (15) arranged at two opposite side walls (16) of the nozzle recess (5).

3. The side gate nozzle (1) according to claim 1, wherein the set screw (7) is arranged in a cover plate (17).

4. The side gate nozzle (1) according to claim 1, wherein the nozzle insert (6) comprises an inlet opening (9) which is pressed by the set screw (7) against an outlet opening (10) arranged at the bottom of the nozzle recess (5).

5. The side gate nozzle (1) according to claim 4, wherein the set screw (7) is arranged concentric with respect to the outlet opening (10).

6. The side gate nozzle (1) according to claim 1, wherein at least one nozzle tip (11) pointing in an outward direction (12) is attached to the nozzle insert (6).

7. The side gate nozzle (1) according to claim 1, wherein the nozzle insert (6) for maintenance is arranged displaceable with respect to the inward direction.

8. The side gate nozzle (1) according to claim 7, wherein the nozzle insert (6) during operation is held in the outward direction (12) against the direction of the melt flow (13) by a first spacer (14).

9. The side gate nozzle (1) according to claim 8, wherein at least two nozzle inserts (6) are positioned in a lateral direction (18) relative to each other by a laterally movable second spacer (19).

10. The side gate nozzle (1) according to claim 1, wherein a cover plate (17) comprises an alignment through-hole (20) in the axial direction to temporarily interconnect in the mounted state the cover plate (17) to the nozzle block (4) in a torsionally resistant manner.

11. The side gate nozzle (1) according to claim 1, wherein the nozzle block (4) comprises at least one guiding groove (21) in the outward direction (12) into which a pin-shaped retainer (22) of the nozzle insert (6) engages during assembly.

12. The side gate nozzle (1) according to claim 11, wherein the nozzle insert (6) is held in a direction of the melt flow (13) during operation by the pin-shaped retainer (22) in contact with an end section (23) of the guiding groove (21).

13. The side gate nozzle (1) according to claim 1, wherein a heating element (32) is arranged in a groove (33) on the outside of the nozzle block (4) and/or the distribution block (3).

14. The side gate nozzle (1) according to claim 13, wherein the heating element (32) comprises at least one meandrous turn between two neighboring nozzle recesses (5).

15. The side gate nozzle (1) according to claim 1, wherein a supporter (34) is arranged in the outward direction adjacent to the nozzle recess (5) extending at least partially in a radial direction to support the nozzle insert (5) in the lateral direction during installation and/or operation.

16. The side gate nozzle (1) according to claim 1, wherein a guider (35) protrudes from at least one of two opposite side walls (16) of the nozzle recess (5) to prevent a tilting of the nozzle insert (6) in the axial direction (z) during installation and/or operation.

17. The side gate nozzle (1) according to claim 16, wherein the distance between the guider (35) and the bottom (8) of the nozzle recess (5) is equal to the height (38) of the nozzle insert (6) in the axial direction (z), such that during installation and/or operation the guider (35) at least temporarily interact with a top face of the nozzle insert (6).

18. An injection mold (24) comprising at least one cavity module (25) which comprises at least one cavity half (26) connected to a side gate nozzle (1) according to claim 1.

19. The injection mold (24) according to claim 18, wherein the cavity module (25) comprises at least one nozzle tip recess (27) connected to the cavity half (26) for accommodating a nozzle tip (11) of the side gate nozzle (1) and forming a detachable connection between the nozzle tip (11) and the nozzle tip recess (27).

20. The injection mold (24) according to claim 19, wherein the at least one nozzle tip recess (27) comprises a sealing section (28) interacting with the nozzle tip (11) in the mounted state to provide a sealing therebetween.

* * * * *